United States Patent [19]

Saur

[11] Patent Number: 4,674,679

[45] Date of Patent: Jun. 23, 1987

[54] THERMOSTATIC VALVE FOR CONTROLLING THE COOLANT TEMPERATURE OF AN INTERNAL-COMBUSTION ENGINE

[75] Inventor: Roland Saur, Stuttgart, Fed. Rep. of Germany

[73] Assignee: Behr-Thomson Dehnstoffregler GmbH, Fed. Rep. of Germany

[21] Appl. No.: 828,274

[22] Filed: Feb. 11, 1986

[30] Foreign Application Priority Data

Dec. 2, 1985 [DE] Fed. Rep. of Germany ....... 3504653

[51] Int. Cl.⁴ .............................................. B60H 1/02
[52] U.S. Cl. ...................................... 236/34.5; 236/51
[58] Field of Search ......................... 236/34.5, 100, 51

[56] References Cited

U.S. PATENT DOCUMENTS

| | | | |
|---|---|---|---|
| 2,401,646 | 6/1946 | Johnson | 236/34.5 X |
| 2,833,478 | 5/1958 | Middleton | 236/34.5 X |
| 3,313,483 | 4/1967 | Nallinger | 236/34.5 |
| 3,386,065 | 5/1968 | Algino | 236/100 X |
| 3,817,450 | 6/1974 | Mische | 236/34.5 |
| 3,907,199 | 9/1975 | Kreger | 236/34.5 X |
| 4,325,508 | 4/1982 | Kung | 236/51 X |

Primary Examiner—William E. Tapolcai
Attorney, Agent, or Firm—Barnes & Thornburg

[57] ABSTRACT

A thermostatic valve for controlling coolant temperature of an internal-combustion engine has a valve body with valve elements for opening and closing corresponding valve openings in response to changes in coolant temperature. In a preferred embodiment, the valve body contains an expansion agent which exerts a force on a working piston which extends out of the valve body. A reactive bearing surface on an adjustable support body is provided immediately adjacent to an end of the working piston. The distance between the reactive bearing surface and the piston and/or valve body can be adjusted to change the characteristics of the valve by changing the distance the piston must move before being restrained by the bearing surface and causing the valve body to move and the valve to open. A mechanism for restoring the piston to a desired end position within the valve body is provided to prevent possible interference with the adjustment of the valve characteristics, which might otherwise result from the piston remaining an unrestored (i.e., intermediate) extended position. In one preferred embodiment, the restoring mechanism is an elastic member, such as a spring, mounted between a stationary portion of the valve housing and stop on the piston shaft. In a second embodiment, which utilizes an electrical adjusting mechanism for adjusting the valve characteristics, the electrical circuit of the adjusting mechanism is designed such that, when the internal-combustion engine is switched off, the adjusting mechanism acts to move the piston toward the valve body.

10 Claims, 2 Drawing Figures

4,674,679

THERMOSTATIC VALVE FOR CONTROLLING THE COOLANT TEMPERATURE OF AN INTERNAL-COMBUSTION ENGINE

BACKGROUND AND SUMMARY OF THE INVENTION

This invention relates to a thermostatic valve for controlling the temperature of the coolant of an internal-combustion engine, particularly of a motor vehicle engine. Such valves typically control the coolant flow from the engine through a bypass and/or heat exchanger, and back to the engine. In a known construction, a valve body is provided which contains an expansion agent carries one or more valve disks and has a working piston which moves out of the valve body when it is heated to cause movement of the valve disks to open the valve. The valve body is typically spring-biased toward the closed position. The working piston interacts with a support body which can be adjusted by means of a regulating unit and which provides a reactive bearing surface for the piston. The valve characteristics can be adjusted by varying the distance between the bearing surface and the valve body.

In a thermostatic valve of the above mentioned type (i.e., a thermostatic valve having a valve body containing an expansion agent and a working piston which can be moved outwardly from the body—German Published Unexamined Patent Application No. DE-OS 32 26 104), this valve construction has proven itself many times in practice. By changing the distances between the control or bearing surface of the support body and the valve body, the valve characteristics can be changed so that control of the temperature of the internal-combustion engine, via the temperature of the coolant, is possible. This control can use the ambient or outside temperature or other parameters as control variables, such as the exhaust gas temperature, the speed and/or the torque of the engine, the vacuum in the suction or intake pipe, the pressure difference in a vacuum box, the oil temperature and other variables.

In a practical application using this type of thermostatic valve, operating conditions may arise in which the control is disrupted and unwanted or undesirable results are obtained. A wax or a wax mixture which is selected for a certain temperature range is conventionally used as the expansion agent. The regulating or adjusting unit preferably includes an electric motor drive. When the internal-combustion engine is switched off, the electric-motor drive is also switched off so that the regulation unit remains in its respective control position. As the temperature of the coolant decreases, the wax serving as the expansion agent solidifies so that the working piston of the thermostatic valve also remains in its respective position. When the internal-combustion engine is re-started under different operating conditions, which may be expected by the time the coolant temperature has gone down, the support body is adjusted by the regulating unit into a control position which corresponds to these operating conditions. When, during this adjustment, the control surface of the support body is moved closer to the valve body of the thermostatic valve, the valve body is shifted causing the thermostatic valve to open because the working piston cannot be pressed into the valve body due to the solidified wax. This result disturbs the intended control arrangement and can lead to undesirable operating conditions of the internal-combustion engine.

An object of this invention is to provide a thermostatic valve of the above-mentioned type in which no such disturbances in the control arrangement occur when the internal-combustion engine is started.

This development ensures that the working piston, after each switching-off of the internal-combustion engine and subsequent cooling of the coolant, is restored or placed back in the valve body so that, when the engine is started again, the support body can be adjusted by the regulating unit into the position that corresponds to the desired control condition, without causing the valve to open. When a restoring spring is used, the size of the spring and/or its arrangement in the valve are selected so as to ensure that other components of the thermostatic valve are not adversely affected (e.g., so that undue force is not exerted against the spring which biases the valve body toward the closed position.

In an especially advantageous embodiment of the invention, it is provided that the restoring path of the working piston (i.e., the distance or range of movement of the piston during restoration) is limited by a stop. To avoid interference with the control arrangement, it is sufficient to place the working piston back along a restoring path that corresponds to the maximum path or adjusting distance variation of the control surface of the support body. By limiting the path of the working piston, the effect of the restoring means is at the same time limited to this path. The result is, on the one hand, that the restoring means does not constantly affect the sealing element which separates the working piston from the area inside the valve body containing the expansion agent. In addition, when the working piston is in the restored position, the restoring means does not affect the closing spring, which is generally provided to hold the valve disks in the closed position, so that an unintended removal of load from the closing spring is avoided. In another embodiment of the invention, the restoring path of the restoring means is limited. This results in the same effect concerning the removal of load from the closing spring and from the sealing element.

In another advantageous embodiment of the invention, the electric circuit of the regulating unit provides a switch-off step or signal by means of which, when the internal-combustion engine is turned off, the regulating unit is adjusted into an end position which corresponds to the moved-in or restored position of the working piston.

Other characteristics and advantages of the invention are found in the following description of preferred embodiments of the thermostatic valve according to the invention, as shown in the drawings.

DETAILED DESCRIPTION OF THE DRAWINGS

Figure 1:
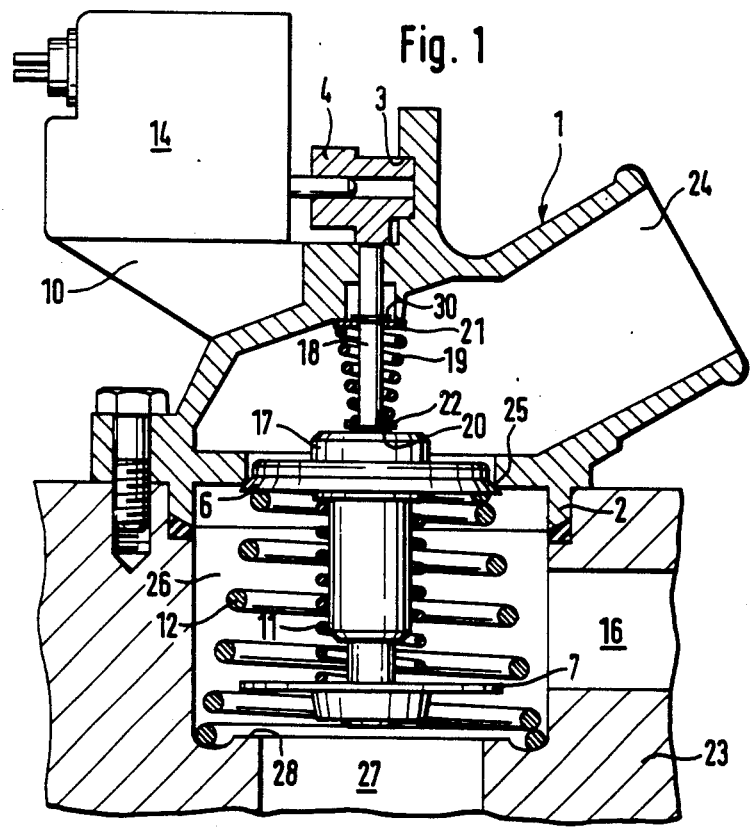
FIG. 1 is a cross-sectional view of a thermostatic valve equipped with a restoring spring for the working piston.

The thermostatic valve shown in FIG. 1 has a valve housing 1 which, by means of a projection 2, is inserted and sealed into a housing 23 of an internal-combustion engine. Valve housing 1 is equipped with a hose-connection 24 which, via a valve seat 25, is in fluid communication with a valve chamber 26. A connection 16 leads into valve chamber 26 through which coolant flows in from the coolant spaces of the internal-combustion engine. A duct 27 is connected to valve chamber 26 opposite valve seat 25. Duct 27 also leads back to the coolant spaces of the internal-combustion engine. Duct 27 is provided with a valve seat 28 with which a valve disk 7 is associated. A valve disk 6 is associated with valve seat 25. Valve disk 6 is firmly connected to a ring collar of a valve body 17. It is pressed against valve seat 25 by means of a conical closing spring 12. Valve disk 7 (associated with valve seat 28 of duct 27) is guided on a projection of valve body 17 by means of a sealing, sliding fit. It is pressed into the end position shown by means of a valve spring 11 which supports itself on a ring collar of valve body 17.

Valve body 17 contains an expansion agent made of a wax selected for a certain temperature range. When this expansion agent is heated, a working piston 18 is driven out of valve body 17. Working piston 18 penetrates a wall of valve housing 1, adjacent to which is a bearing surface formed as an eccentric 4. On the outside of valve housing 1, a flange 10 is mounted to which an electric motor 14, preferably a stepping motor, is attached and which serves as a regulating unit. The shaft of electric motor 14 drives eccentric 4. Eccentric 4 is disposed in a slideway 3 in a recess of a projection of valve housing 1.

Working piston 18 is loaded by means of a restoring spring 19 which is supported on one end by the wall of valve housing 1 via a disk 21 guided on working piston 18. The other end of restoring spring 19 is supported by another disk 22 which is guided on working piston 18 and retained by a locking ring 20 fastened on working piston 18 opposite disk 22. Closing spring 12 and restoring spring 19 are coordinated with one another in such a way that restoring spring 19 can cause a return or restoring of working piston 18 into valve body 17, whereas closing spring 12 is preferably sized to be much stronger so that it can bring valve disk 6, along with housing 17, into its closed position resting against valve seat 25 against the effect of restoring spring 19. In the end position of working piston 18 illustrated in FIG. 1, (i.e., the restored position), locking ring 20 rests against the upper side of valve body 17 so that locking ring 20 serves as the stop for limiting the restoring path of working piston 18.

As a modification of the embodiment shown, working piston 18 is equipped with a stop which interacts with a stop surface on the wall of valve housing 1 and which limits the restoring movement of working piston 18 also to the maximum adjustment distance of the control surface of eccentric 4. In this case, locking ring 20 is mounted on working piston 18 a clear distance from the facing end of valve valve body 17. Restoring spring 19 is also equipped with means for limiting its expansion path. On the side of disk 21 facing away from the restoring spring, a locking ring 30 is mounted on working piston 18 which, in the restored position of working piston 18, rests against disk 21. It is then not necessary for locking ring 20 to rest against valve body 17.

In FIG. 1, the thermostatic valve is shown in the starting position when the coolant is cold. When the internal-combustion engine is switched on, the cold coolant flows into valve chamber 26 and directly, via duct 27, back into the coolant spaces of the engine. When the coolant is heated, the expansion agent contained in valve housing 17 is also heated and expands in a selected temperature range. As a result, working piston 18 is moved out of valve housing 17 and into contact with eccentric 4 which forms a support body. By means of additional force applied to working piston 18, valve body 17 is moved along with valve disks 6 and 7. As a result, the opening to connecting piece 24 is opened through which the coolant flows to a radiator that is not shown and from which it flows back to the coolant spaces of the internal-combustion engine. When working piston 18 is extended further, valve disk 7 is brought into sealing contact with valve seat 28.

Through an adjustment of the eccentric by means of an electric motor serving as the regulating unit 14, the characteristics of the thermostatic valve can be changed due to the fact that the eccentric surface, which serves as the bearing or support surface for working piston 18, is adjusted. In the position illustrated in FIG. 1, the eccentric is located in an end position in which the distance between the eccentric surface and valve body 17 is the smallest, so that the working piston, when extended, must cover the shortest path before, by means of its further extension, valve body 17 and valve disk 6 are moved. This position of eccentric 4 would for example, be desirable when the internal-combustion engine is to be started at higher ambient temperatures. In this case, the valve formed by valve disk 6 and valve seat 25 would open at a lower coolant temperature value.

In the case of high outside temperatures, it is desirable to open the valve formed by valve disk 6 and valve seat 25 at a lower coolant temperature value to avoid excessive heating. If the restoring means, shown as a restoring spring 19 in this preferred embodiment, did not exist, a disturbance in the control of the valve could occur. If the internal-combustion engine is first operated with the eccentric in the position that is not shown in FIG. 1 and then switched off, eccentric 4 and working piston 18 would remain in the end position that is not shown. When the coolant is cooled and, as a result, the volume of the expansion agent decreases, closing spring 12 presses valve body 17 and valve disk 6 into the closed position shown. If the internal-combustion engine is then restarted, for example, at a very hig outside temperature, eccentric 4, via electric motor 14, will be turned into the position shown. Since, however, working piston 18 would not be able to be pressed back against the solidified expansion agent in valve body 17, an adjustment of eccentric 4 will result in an adjustment of valve body 17 and, thus, to a premature opening of the valve formed by valve disk 6 and valve seat 25. This would result in an undesirably slow heating of the coolant and of the internal-combustion engine. This interference by the outside temperature with the control process could also take place when other control parameters are considered.

In order to avoid this danger of an interference with the control process, restoring spring 19 is provided which acts on locking ring 20 mounted on working piston 18 and restores working piston 18 preferably by at least the maximum possible adjusting position of eccentric 4. The distance of locking ring 20, which serves as the stop at the end of valve body 17, is selected to be such that, when working piston 18 is restored along this path, it rests against the end of valve body 17. Subsequently, the load is removed from restoring spring 19 so that additional forces are not exerted on inside sealing elements, nor on closing spring 12. Closing spring 12 is preferably sized to be significantly stronger than restoring spring 19. Working piston 18 is, thus, always restored into a starting position after the internal-combustion engine is switched off such that eccentric 4 can subsequently be guided in a free and unimpaired manner into the required position corresponding to the desired control.

Restoring spring 19 is not necessary when a suitable circuit is provided for the electrically driven regulating member, electric motor 14. When the circuit is designed such that the regulating member, after the internal-combustion engine is switched off, is restored into the end position shown in FIG. 1 which corresponds to an early opening of the thermostatic valve, working piston 18 is always returned to its retracted end position when the coolant of the internal-combustion engine is cooled and, as a result, the thermostatic valve is closed. When the internal-combustion engine is switched on, eccentric 4 can be brought into the position required by of the control in an unimpaired manner and without actuating the thermostatic valve.

Figure 2:
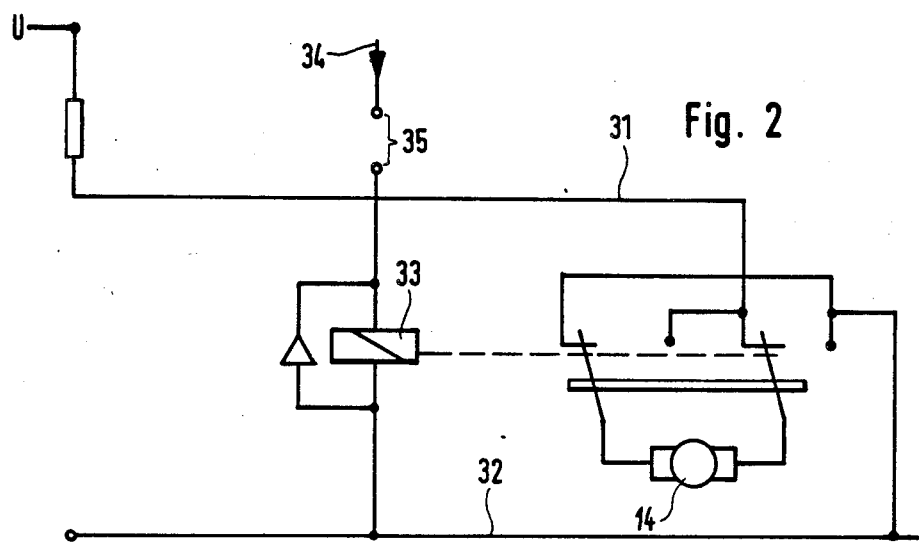
FIG. 2 is a circuit for the regulating member of the thermostatic valve of FIG. 1, in which the restoring spring is not needed.

Referring to FIG. 2, electric motor 14 is located between line 31, which is connected to a voltage source U and ground line 32 and is controlled by a relay 33. The relay is located between ground line 32 and a voltage source. The line to the voltage source contains a switching device 34 that is indicated by an arrow. In the case of a motor vehicle, switching device 34 is the ignition switch. By means of a bracket 35, it is indicated that the control for the adjusting of working piston 18, via electric motor 14, is connected by a line to relay 33. Relay 33 is switched in such a way that, in the de-energized condition, i.e., when switch 34 is opened by turning off the ignition lock, it causes rotation of electric motor 14 in such a way that working piston 18 is moved by eccentric 4 into the lowest position, as shown in FIG. 1.

From the preceding description of the preferred embodiment, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. A thermostatic valve for controlling coolant temperature of an internal-combustion engine, particularly a motor vehicle engine, by controlling the coolant flow from the engine through a bypass and/or through a heat exchanger back to the engine, comprising:
    a valve body provided with valve disks for opening and closing valve openings, and having a working piston, and containing an expansion agent for exerting a force on the piston tending to move the piston out of the valve body in response to an increase in coolant temperature;
    biasing means for biasing the valve body toward a closed position;
    an adjustable support body adjacent to said valve body and working piston, said support body having a bearing surface which interacts with said working piston to cause movement of the valve disks when the piston moves out of the valve body in response to an increase in coolant temperature;
    electrical adjusting means for adjusting the distance between the bearing surface of the support body and the valve body, said adjusting means being switched off when the engine is shut down; and
    elastic restoring means for restoring the piston into the valve body in response to a decrease in coolant temperature following shut down of the engine independently of the position of the support body.

2. A thermostatic valve according to claim 1, wherein movement of the working piston into the valve body by the restoring means is limited by a stop.

3. A thermostatic valve according to claim 1, wherein the effective working range of the restoring means is limited.

4. A thermostatic valve according to claim 1, wherein said restoring means comprises a restoring spring arranged between a stationary surface penetrated by the working piston and support means arranged on the working piston.

5. A thermostatic valve according to claim 4, wherein the working piston is provided with a stop to limit its range of movement into the valve body.

6. A thermostatic valve according to claim 4, wherein the support means, which supports the restoring spring and which is arranged on the working piston, serves as a stop to limit movement of the working piston into the valve body.

7. A thermostatic valve according to claim 4, wherein the restoring spring is provided with means for limiting its range of effectiveness.

8. A thermostatic valve according to claim 1, wherein the restoring means comprises a restoring spring acting upon the working piston and disposed within the valve body.

9. A thermostatic valve for controlling coolant temperature of an internal-combustion engine, particularly a motor vehicle engine, by controlling the coolant flow from the engine through a bypass and/or through a heat exchanger back to the engine, comprising:
    a valve body provided with valve disks for opening and closing valve openings, and having a working piston, and containing an expansion agent for exerting a force on the piston tending to move the piston out of the valve body in response to an increase in coolant temperature;
    biasing means for biasing the valve body toward a closed position;
    an adjustable support body adjacent to said valve body and working piston, said support body having a bearing surface which interacts with said working piston to cause movement of the valve disks when the piston moves out of the valve body in response to an increase in coolant temperature;
    adjusting means for adjusting the distance between the bearing surface of the support body and the valve body; and
    circuit means, connected to said adjusting means, for causing said adjusting means to adjust the support body to an end position, corresponding to a restored position of the working piston, when the internal-combustion engine is switched off.

10. A thermostatic valve for controlling coolant temperature of an internal-combustion engine, comprising:
    a valve body having one or more valve elements for opening and closing one or more corresponding valve openings, and having a working piston extending from the valve body, and having means for exerting a force on the working piston tending to move the piston out of the valve body in response to an increase in coolant temperature;

adjustable support means adjacent to an end of said working piston, said support means providing a bearing surface for restraining movement of the piston;

electrical adjusting means for adjusting the distance between the bearing surface of the support body and the working piston, said adjusting means being switched off when the engine is shut down; and means for exerting a force on the piston to move the piston to a fully restored position in the valve body as the coolant temperature decreases following shut down of the engine.

* * * * *